United States Patent [19]

Watanabe et al.

[11] Patent Number: 4,697,386
[45] Date of Patent: Oct. 6, 1987

[54] CONSTRUCTION OF DOOR IN MOTOR VEHICLE

[75] Inventors: Hiroyuki Watanabe; Eiichi Hamada, both of Toyota; Motomu Hayashi, Okazaki; Kenji Ono, Toyota, all of Japan

[73] Assignee: Toyota Jidosha Kabushiki Kaisha, Japan

[21] Appl. No.: 635,202

[22] Filed: Jul. 27, 1984

[30] Foreign Application Priority Data

Jul. 29, 1983 [JP] Japan ............................ 58-119490[U]

[51] Int. Cl.⁴ ............................................... E05F 11/38
[52] U.S. Cl. .......................................... 49/374; 49/441
[58] Field of Search .................. 49/374, 375, 441, 227

[56] References Cited

U.S. PATENT DOCUMENTS 4,457,111 7/1984 Koike ..................................... 49/441
4,490,942 1/1985 Arnheim et al. ....................... 49/374

FOREIGN PATENT DOCUMENTS 0040588 11/1981 European Pat. Off. .............. 49/374
2709298 9/1977 Fed. Rep. of Germany ...... 296/146
56158321 4/1955 Japan .

Primary Examiner—Kenneth Downey
Attorney, Agent, or Firm—Finnegan, Henderson, Farabow, Garrett & Dunner

[57] ABSTRACT

The present door for a motor vehicle includes a door glass, a door glass piece and a guide groove. The door glass piece has a substantially crank shape and a forward end sliding portion offset into the vehicle and secured to an end portion of the door glass, the sliding portion of the door glass piece being slidably guided by the guide groove on a door frame aligned to enable opening and closing of the door glass, while the outer surfaces of the door glass and the door frame are substantially flush with each other. According to the present invention the sliding portion of the door glass piece and the door glass are formed such that an angle formed by a center line of the sliding portion and the outer surface of the door glass is less than 180°, the outer surface of the vehicle being curved and the door glass conforming to the curvature of the outer surface of a vehicle body, which is continuously formed by the outer surfaces of the door glass and the door frame.

8 Claims, 3 Drawing Figures

CONSTRUCTION OF DOOR IN MOTOR VEHICLE

BACKGROUND OF THE INVENTION

1. Field of the Invention

This invention relates to a construction of a door in a motor vehicle, and more particularly to a construction of a door in a motor vehicle having a so-called flush surface wherein a vehicle body and the surface of a door glass are made flush with each other.

2. Description of the Prior Art

The air resistance during running of a motor vehicle at high speed may reach more than twice the rolling resistance.

In view of the above, there has been proposed a so-called flush surface type motor vehicle in which the surfaces of a vehicle body including the surfaces of door glasses are made flush with one another so as to reduce the air resistance.

A door in the flush surface type motor vehicle of the type described should be constructed such that the outer surface of a door glass and the outer surface of a door frame are substantially flush with each other in the fully closed state of the door glass. However, such disadvantages are presented that the door glass is sucked outwardly due to a difference in pressure between the interior and the exterior of a compartment during running of the motor vehicle at high speed, causing the door glass to float up and outward from the outer surface of a door, and so-called wind breaking sounds occur and the air resistance during running is increased.

To obviate the above-described disadvantages, as described in Japanese Utility Model Kokai (Laid-Open) No. 158321/81 (Refer to FIG. 3) for example, there is proposed a construction of a door in a motor vehicle wherein a door glass piece 2 being of a substantially crank shape and having a forward end sliding portion 2A offset into a compartment 3 is secured to an end portion 1A of a door glass 1, and the sliding portion 2A of this door glass piece 2 is slidably guided by a guide groove 5 on a door frame 4 in directions of opening and closing of the door glass 1, so that the outer surface of the door glass 1 and the door frame 4 can be substantially flush with each other and the door glass 1 can avoid being sucked outwardly.

In FIG. 3, guide groove 5 also includes a seal rubber 5a disposed in the guide groove 5 and brought into contact with the forward end sliding portion 2A of the door glass piece 2, and a center pillar 7.

Now, as another measure for reducing the air resistance during running of the motor vehicle at high speed, there has recently been adopted a shape of a vehicle body, in which a forward or rear portion of the vehicle body of the motor vehicle is squeezed inwardly in the widthwise direction of the vehicle body.

In this case, the outer surface of the door glass, which is substantially flush with the outer surface of the vehicle body, should be curved, even a section of the door glass, when viewed in plan view, conforming to the shape of the outer surface of the vehicle body.

When the door glass is of a shape curved contiguously to the outer surface of the vehicle body in a section in a plan view as described above, for the door of a motor vehicle using the aforesaid door glass piece, typically that the door glass piece is of a substantially crank shape and the sliding portion 2A thereof is in parallel with the outer surface of the door glass 1. Consequently the aforesaid arrangement cannot be applied to a motor vehicle in which the outer surface is curved.

SUMMARY OF THE INVENTION

It is therefore the primary object of this invention to provide a construction of a door in a motor vehicle in which the present invention is applicable to the construction even when the outer surface of the vehicle body of a motor vehicle including a door glass has a curvature in a section in a plan view.

To this end, the present invention contemplates that, in a construction of a door in a motor vehicle, a door glass, a door glass piece, and a guide groove, the door glass piece having a substantially crank shape and having a forward end sliding portion offset into the vehicle and secured to an end portion of the door glass, the sliding portion of the door glass piece being slidably guided by the guide groove on a door frame aligned to enable opening and closing of the door glass, while the outer surfaces of the door glass and the door frame are substantially flush with each other, wherein the sliding portion of the door glass piece and the door glass are formed such that a first angle formed by a center line of the sliding portion and the outer surface of the door glass is less the 180°, the outer surface of the vehicle being curved and the door glass conforming to the curvature of the outer surface of a vehicle body, which is continuously formed by the outer surfaces of the door glass and the door frame, so that the door glass and the door frame can be formed by the curvature fitting in with the curvature of the outer surface of the vehicle body, to thereby further reduce the air resistance during running of the vehicle.

To the above end, the present invention contemplates that the outer surface of said door glass and the outer surface of said door frame have a substantially continuous convex outer surface extending in the widthwise direction of the vehicle body in a section in a plan view, and an angle formed by the center line of said sliding portion and the outer surface of said door glass is being substantially equal to a second angle formed by a line tangent to the outer surface of said door glass at an intersection between the center line of said sliding portion and the outer surface of said door glass and a tangent to the outer surface of said door frame at a position on the outer surface of the guide groove.

To the above end, the present invention contemplates that the outer surface of said door glass is convex and wherein the outer surface of said door frame is substantially planar and contiguous with the outer surface of said door glass, said guide groove being in parallel with the outer surface of said door frame, and wherein said first angle formed by the center line of said sliding portion and the outer surface of said door glass is substantially equal to a second formed by a line tangent to the outer surface of said door glass at an intersection between the center line of said sliding portion and the outer surface of said door glass and the outer surface of said door frame.

To the above end, the present invention contemplates that a portion of said door glass piece includes an extension along a surface of the end portion of said door glass within the vehicle is formed along the surface of said door glass and said door glass piece is fastened and fixed to said door glass along said extension.

To the above end, the present invention contemplates that said guide groove is substantially in parallel with the outer surface of said door frame positioned outwardly from said guide groove within the vehicle, said sliding portion of the door glass piece having a center line formed substantially in parallel with said guide groove.

DETAILED DESCRIPTION OF THE PREFERRED EMBODIMENT

Description will hereafter be given of one embodiment of the present invention with reference to the drawings.

Figure 3:
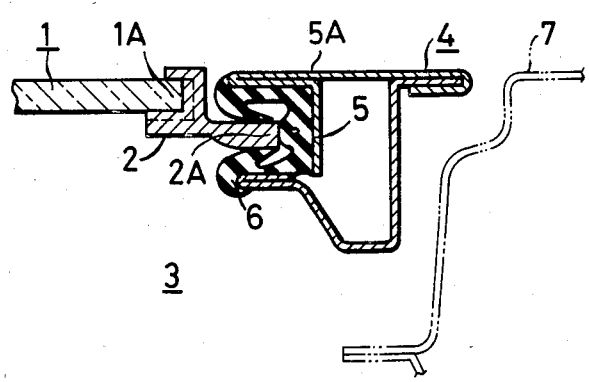
FIG. 3 is an enlarged sectional view taken along the line II—II in FIG. 1, showing the door in a motor vehicle of the prior art.

In this embodiment, same reference numerals indicating the parts in the conventional construction of a door in a motor vehicle as shown in FIG. 3 are used to designate same or similar parts, so that detailed description will be omitted.

Figure 1:
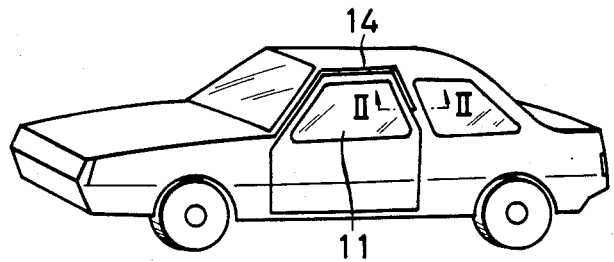
FIG. 1 is a perspective view showing the appearance of the motor vehicle to which is the present invention is applied.
Figure 2:
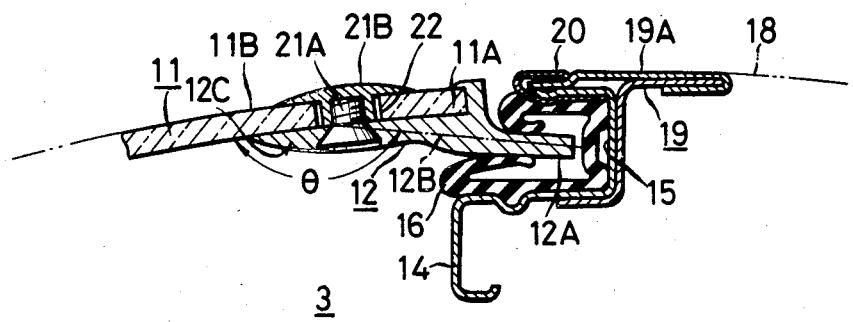
FIG. 2 is an enlarged sectional view taken along the line II—II in FIG. 1, showing an embodiment of the construction of a door in a motor vehicle according to the present invention.

As shown in FIGS. 1 and 2, according to this embodiment, in a construction of a door in a motor vehicle wherein a door glass piece 12 being of a substantially crank shape and having a forward end sliding portion 12A offset into a compartment 3 is secured to an end portion 11A of a door glass 11 curved to be convex on the outer surface of the vehicle body, and the sliding portion 12A of the door glass piece 12 is slidably guided by a guide groove 15 on a door frame 14 in directions of opening and closing of the door glass 11, whereby the outer surfaces of the door glass 11 and the door frame 14 are made substantially flush with each other with a continuous curvature, the sliding portion 12A of the door glass piece 12 and the door glass 11 are formed such that an angle $\theta$ formed by a center line 12B of the sliding portion 12A and the surface of the door glass 11 is less than 180°, fitting in with a curvature of the outer surface 18 of a vehicle body, which is contiguously formed by the door glass 11 and the door frame 14.

More specifically, the angle $\theta$ formed by the center line 12B of the sliding portion 12A and the outer surface 11B of the door glass 11 is substantially equal to an angle formed by a tangent line of the outer surface 11B of the door glass 11 at an intersection between the center line 12B of the sliding portion 12A and the outer surface 11B of the door glass 11 and a tangent line of the outer surface 19A of the door panel 19 as being the outer surface of the door frame 14 at a position on the outer surface of the guide groove 15.

As shown in FIG. 2 the present invention includes a seal rubber 16 brought into contact with the sliding portion 12A to guide the same in the directions of opening and closing of the door glass 11 and sealing the interior of the compartment 3 from the exterior, a door panel 19 to which the door frame 14 is integrally welded, a door molding 20 secured in a manner to surround outer end portions of the door panel 19 and the door frame 14, which are proximate the end portion 11A of the door glass 11, which includes a bolt 21A and a nut 21B for fastening and fixing the door glass piece to the door glass through a hole 22 formed in the door glass 11. As also shown in FIG. 2, a portion of the door glass piece 12 along a surface of an end portion of the door glass 11 on the side of the compartment 3 is extended along the surface of the door glass 11 on the side of the compartment 3 toward the center of the door glass 11 so as to form an extension 12C, and the door glass piece 12 is fastened fixed to the door glass 11 by the bolt 21A and nut 21B in this extension 12C.

The door frame 14 is normally secured to the door panel 19 in parallel with the outer surface 19A of the door panel 19, and the guide groove 15 formed in this door frame 14 is disposed also in parallel with the outer surface 19A of the door panel 19, whereby a center axis of the sliding portion 12A guided by this guide groove 15 is disposed also in parallel with the outer surface 19A of the door panel 19.

In contrast thereto, the door glass 11 is disposed at an angle less than 180° to the center line 12B of the sliding portion 12A, whereby, even if the tangent line of the outer surface of the door glass 11 intersects the tangent line of the outer surface 19A of the door panel 19 at an angle less than 180°, i.e. the outer surface of the door glass 11 and the outer surface 19A of the door panel 19 have a curved surface of a continuous curvature, the sliding portion 12A can be guided at the central portion of the guide groove 15.

As a consequence, even in a motor vehicle in which the outer surface 18 of the vehicle body is curved in a section in plan view, the door glass 11 can be held substantially flush with the outer surface 18 of the vehicle body by use of the door glass piece 12.

Furthermore, even when the outer surface 11B of the door glass 11 is formed into a curved surface to be convex outwardly, the outer surface 19A of the door panel 19 as being the outer surface of the door frame 14 is formed into a planar surface contiguous with the outer surface 11B of the door glass 11. Further the guide groove 15 is formed in parallel with the outer surface 19A. The angle formed by the center line 12B of the sliding portion 12A and the outer surface 11B of the door glass 11 is made substantially equal to the angle formed by the tangent line of the outer surface 11B and the outer surface 19A at the intersection between the center line 12B of the slide portion 12A and the outer surface 11B. Therefore, the door glass 11 can be held substantially flush with the outer surface 18 of the vehicle body.

In the above-described embodiment, the portion of the door glass piece 12 along the surface of the end portion 11A of the door glass 11 on the side of the compartment 3 is extended along the surface of the door glass 11 on the side of the compartment 3 toward the center of the door glass 11 so as to form the extension 12C, and the door glass piece 12 is fastened and fixed to the door glass 11 in this extension 12C, whereby a rigidity of fastening the door glass piece 12 to the door glass is high, so that the door glass 11 can be stably guided.

In the above-described embodiment, the door glass piece 12 is secured to the end portion 11A of the door glass 11 by means of the bolt 21A and the nut 21B, however, the present invention need not necessarily be limited to this, and, the door glass piece 12 may be secured to the door glass 11 through any other means.

For example, the door glass piece 12 may be bonded to the door glass 11 or the door glass piece 12 may be chamfered on the end portion 11A of the door glass 11.

Additionally, in the above-described embodiment, a so-called panel door having the door frame 14 may be welded to the door panel 19, however, the present invention need not necessarily be limited to this, and, the present invention is applicable to a door other than the panel door.

What is claimed is:

1. A door in a motor vehicle, which comprises: a door glass, a door glass piece, and a guide groove, said door glass piece being of a substantially crank shape and having a forward end sliding portion offset into the vehicle and secured to an end portion of said door glass, said sliding portion of said door glass piece being slidably guided by said guide groove on a door frame aligned to enable opening and closing of said door glass while the outer surfaces of the door glass and the door frame are substantially flush with each other, wherein said sliding portion of said door glass piece and said door glass are formed such that a first angle formed by a center line of said sliding portion and the outer surface of said door glass is less than 180°, the outer surface of the vehicle being curved and said door glass conforming to the curvature of the outer surface of a vehicle body, which is continuously formed by the outer surfaces of said door glass and said door frame, wherein the outer surface of said door glass and the outer surface of said door frame have a substantially continuous convex outer surface extending in the widthwise direction of the vehicle body, said first angle being substantially equal to a second angle formed by a line tangent to the outer surface of said door glass at an intersection between the center line of said sliding portion and the outer surface of said door glass and a line tangent to the outer surface of said door frame at a position on the outer surface of said guide groove.

2. A door in a motor vehicle, which comprises: a door glass, a door glass piece, and a guide groove, said door glass piece being of a substantiallly crank shape and having a forward end sliding portion offset into the vehicle and secured to an end portion of said door glass, said sliding portion of said door glass piece being slidably guided by said guide groove on a door frame aligned to enable opening and closing of said door glass, while the outer surfaces of the door glass and the door frame are substantially flush with each other, wherein said sliding portion of said door glass piece and said door glass are formed such that a first angle formed by a center line of said sliding portion and the outer surface of said door glass is less than 180°, the outer surface of the vehicle being curved and said door glass conforming to the curvature of the outer surface of a vehicle body, which is continuously formed by the outer surfaces of said door glass and said door frame, wherein the outer surface of said door glass is convex and wherein the outer surface of said door frame is substantially planar to and contiguous with the outer surface of said door glass, said guide groove being in parallel with the outer surface of said door frame, and wherein said first angle is substantially equal to a second angle formed by a line tangent to the outer surface of said door glass at an intersection between the center line of said sliding portion and the outer surface of said door glass and the outer surface of said door frame.

3. The door in a motor vehicle as set forth in claim 2, wherein said guide groove is substantially in parallel with the outer surface of said door frame positioned outwardly from said guide groove within the vehicle, said sliding portion of said door glass piece having a center line formed substantially in parallel with said guide groove.

4. The door in a motor vehicle as set forth in claim 3, wherein said guide groove is substantially in parallel with the outer surface of said door frame positioned outwardly from said guide groove within the vehicle, said sliding portion of said door glass piece having a center line formed substantially in parallel with said guide groove.

5. The door in a motor vehicle as set forth in claim 2, wherein said door glass piece includes an extension along a surface of the end portion of said door glass within the vehicle, and said door glass piece is fastened and fixed to said door glass along said extension.

6. The door in a motor vehicle as set forth in claim 3, wherein said door glass piece includes an extension along a surface of the end portion of said door glass within the vehicle, and said door glass piece is fastened and fixed to said door glass along said extension.

7. The door in a motor vehicle as set forth in claim 3, wherein said door glass piece includes an extension along a surface of the end portion of said door glass within the vehicle, and said door glass piece is fastened and fixed to said door glass along said extension.

8. The door in a motor vehicle as set forth in claim 4, wherein said door glass piece includes an extension along a surface of the end portion of said door glass within the vehicle, and said door glass piece is fastened and fixed to said door glass along said extension.

* * * * *